Patented Jan. 24, 1928.

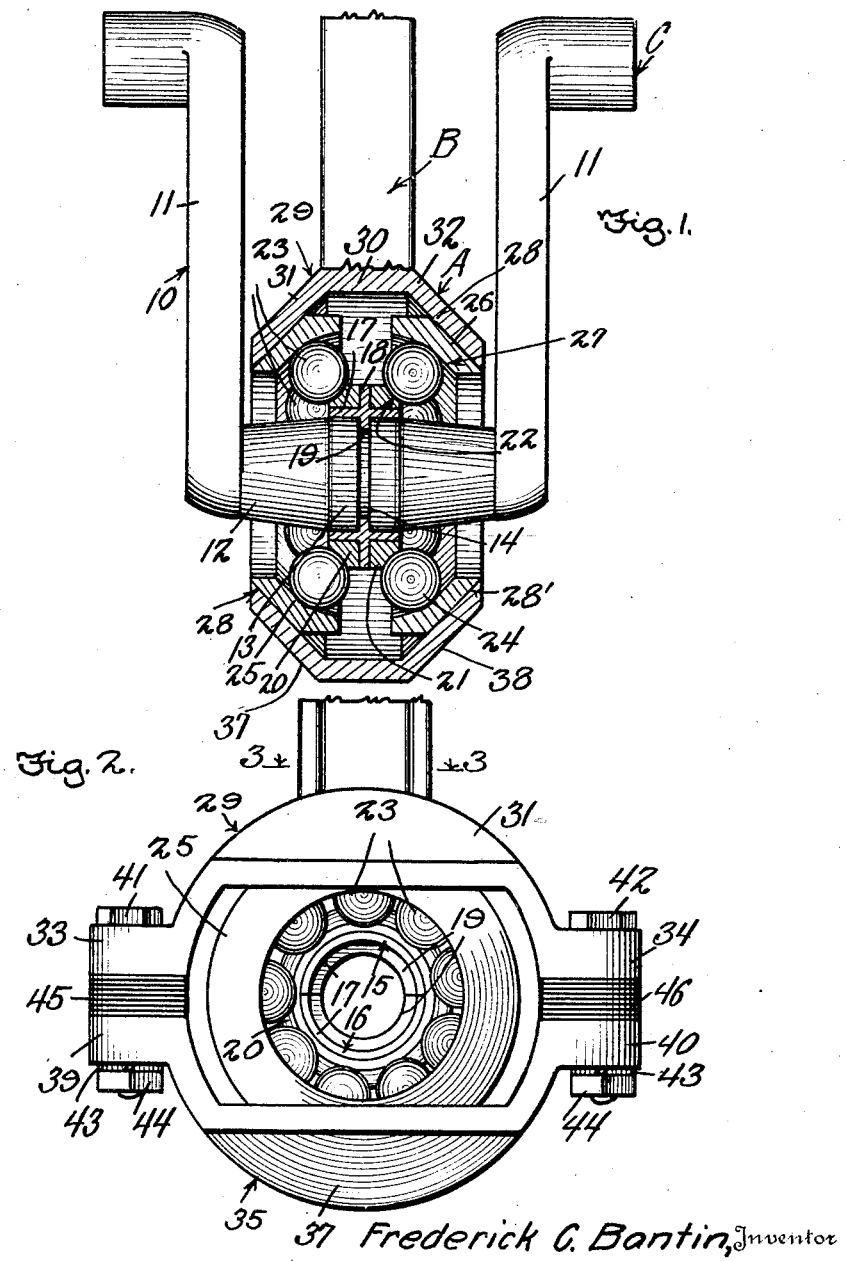

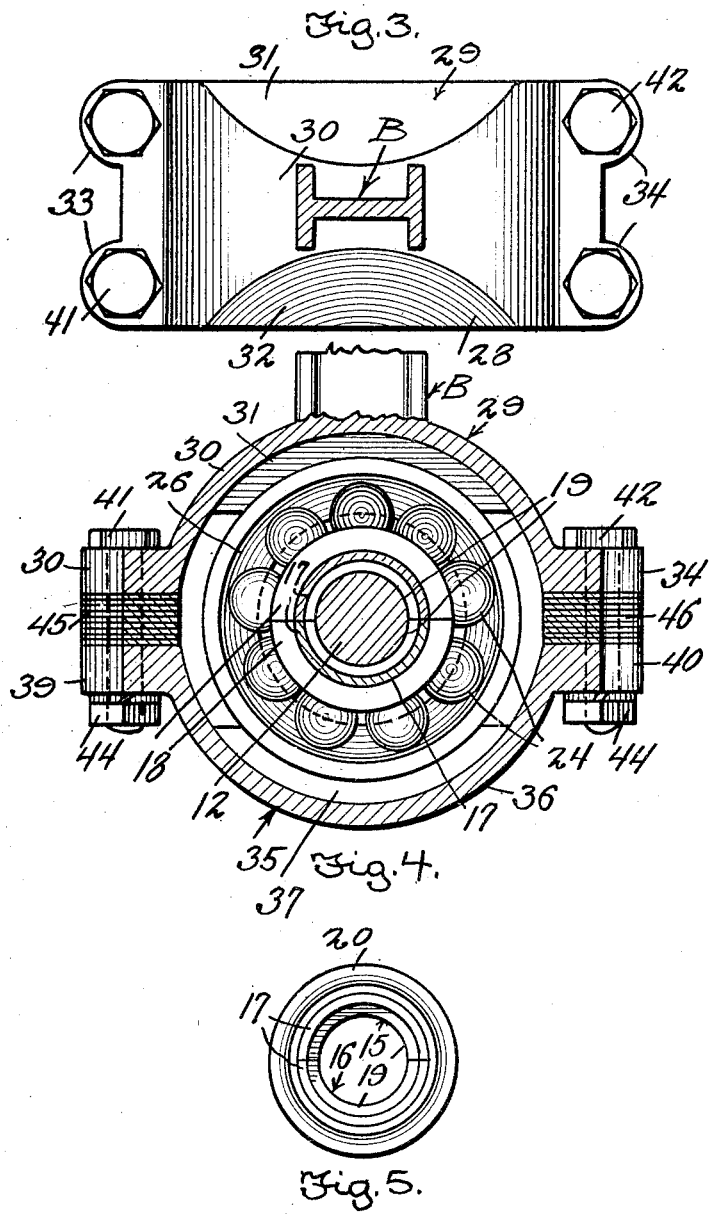

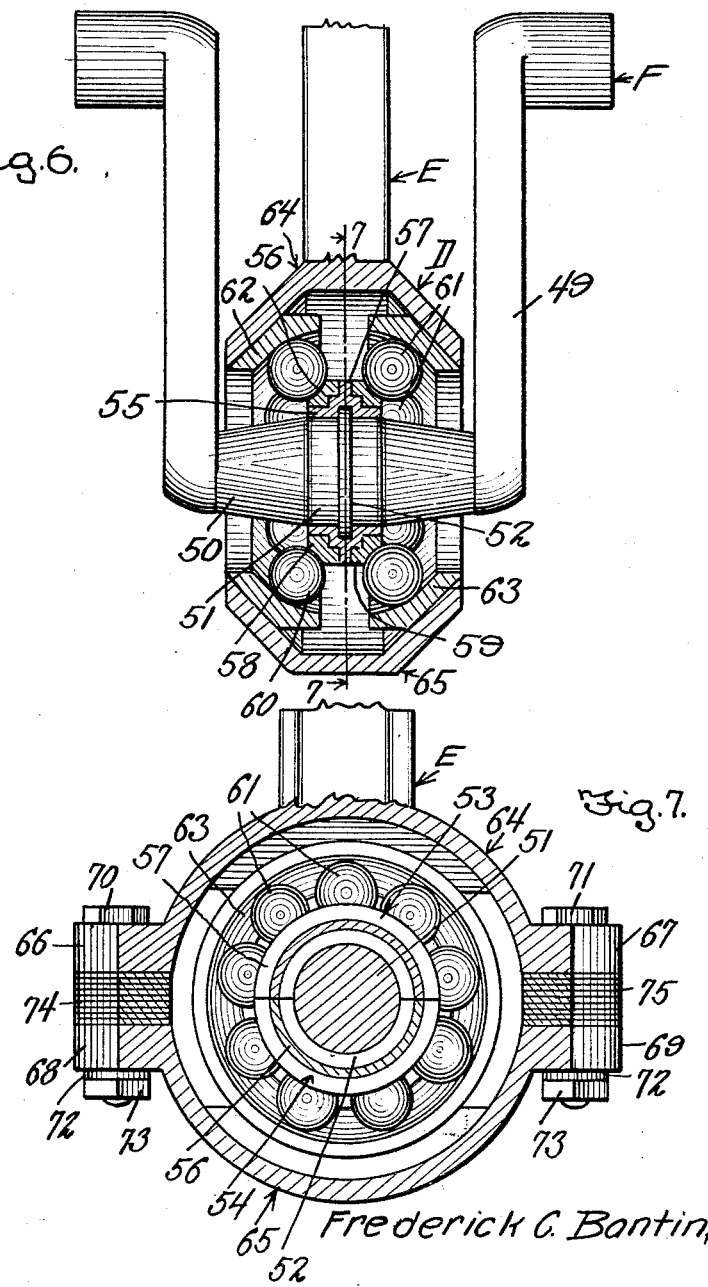

1,656,970

UNITED STATES PATENT OFFICE.

FREDERICK C. BANTIN, OF SALAMANCA, NEW YORK.

BALL-BEARING CONNECTION.

Application filed July 14, 1926. Serial No. 122,478.

This invention appertains generally to new and useful improvements in ball bearing connections and has more particular reference to a novel and efficient ball bearing assembly primarily designed for securing a connecting rod to the crank pin of a crank shaft.

An important object of the present invention is to improve generally the manner of securing the connecting rod to the crank shaft so that the amount of friction between these elements will be reduced to a minimum.

Another important object of the present invention is to provide such a ball bearing connection which is capable of being easily and quickly adjusted so that any loose play existing between the various parts may be readily taken up.

Another object of the invention is the provision of such an improved ball bearing connection which consists of a minimum number of parts, all of which may be readily assembled and disassembled relative to one another so that any worn or broken parts may be easily and quickly renewed.

Another object of the invention is the provision of such an improved ball bearing connection having incorporated therewith means for effectively preventing any lateral movement of the connecting rod relative to the crank shaft.

A further object of the present invention is to provide such a ball bearing connection which, while simple in its construction, is nevertheless strong, sturdy and durable, one which is practical and efficient in its operation, and one which can be manufactured and placed on the market at a reasonable cost.

With these and numerous other objects in view, the invention resides in the novel construction, combination and arrangement of parts which will be hereinafter more fully described, illustrated in the accompanying drawings and particularly pointed out in the appended claims.

In the drawings forming a part of this application:

Figure 1 is a vertical transverse central sectional view through a ball bearing connection constructed in accordance with the present invention showing the manner in which the same is utilized to secure a connecting rod to the crank pin of a crank shaft.

Figure 2 is a side elevation of the connection showing the same removed from the crank shaft.

Figure 3 is a sectional view taken on line 3—3 of Figure 2.

Figure 4 is a sectional view taken on line 4—4 of Figure 3.

Figure 5 is a detail view of the semi-circular ring sections and the supporting rings associated therewith.

Figure 6 is a view similar to Figure 1 showing a somewhat modified form of the present invention.

Figure 7 is a sectional view taken on line 7—7 of Figure 6.

Referring now more particularly to the accompanying drawings and especially to Figures 1 to 5 inclusive wherein has been shown one practical embodiment of the present invention, the letter A generally indicates my improved ball bearing connection for connecting the connecting rod B to the crank shaft C.

The crank shaft C is constructed with the usual throw arm 10 comprising the spaced crank cheeks 11 and the integral crank pin 12. The crank pin 12 is of a novel construction and it will be noted that the same is provided with a cylindrical central portion 13 which tapers towards its opposite ends, so that the outer ends of the said crank pin 12 are of a less diameter than the central cylindrical portion 13 thereof. The central cylindrical portion 13 is provided with a circumferential groove 14 and the diameter of the crank pin 12 is purposely made larger at its center to compensate for the said groove 14 so as not to weaken the same.

Carried by the cylindrical central portion 13 of the crank pin 12 is a two-part ring comprising the upper and lower semi-circular sections 15 and 16, each of said sections being substantially cross-shaped in cross section as shown in Figure 1 and comprising the substantially wide base portion 17 adapted to engage the central cylindrical portion 13. Formed on the outer surface of the base portion 17 intermediate its side edges is the outwardly projecting circumferentially extending tongue 18 while formed on the inner surface thereof is an inwardly projecting circumferentially extending rib 19 in alinement with the tongue 18, the ribs 19 of the said ring sections 15 and 16 being received within the circumferential groove 14 in the crank pin 12.

Fitted on the base portions 17 of the semi-circular ring sections 15 and 16 at opposite sides of the tongues 18 are the ball bearing supporting rings 20 and 21, which serve to secure the said ring sections together, the outer corners of the said rings 20 and 21 being provided with annular grooves or recesses 22 which receive the ball bearings 23 and 24.

Arranged to be slipped over the opposite ends of the crank shaft C are the ball bearing retaining rings 25 and 26, the inner faces thereof being beveled as at 27 to provide annular seats for the ball bearings 23 and 24 while the outer side faces of the upper and lower portions of the said retaining rings are beveled as at 28 and 28' for a purpose which will be more clearly hereinafter described.

For the purpose of securing the retaining rings 25 and 26 in position, the lower end of the connecting rod B is formed with a cap 29 comprising the semi-circular top wall 30 and the divergent side walls 31 and 32, the inner surfaces of the side walls of which are adapted to snugly engage the upper outer beveled faces 28 of the retaining rings 25 and 26, the ends of the top wall 30 being formed with the outwardly directed securing lugs 33 and 34.

A bottom cap 35 similar to the cap 29 is also provided and comprises the semi-circular bottom wall 36 and the divergent side walls 37 and 38, the inner surfaces of said side walls being adapted to snugly engage the lower outer beveled faces 28' of the retaining rings 25 and 26. The bottom wall 36 being also provided at its opposite ends with the outwardly directed securing lugs 39 and 40 adapted to aline with the lugs 33 and 34 on the cap 29. Passing respectively through the said lugs 33 and 39 and the lugs 34 and 40 are the securing bolts 41 and 42, the lower ends thereof receiving suitable lock washers 43 and nuts 44. Arranged on the said bolts 41 and 42 between the said securing lugs 33 and 39 and 34 and 40 are a plurality of shims 45 and 46.

When securing the connecting rod B to the crank pin 12 of the crank shaft C, the sections 15 and 16 of the two-part ring are first placed in position and the inwardly extending ribs 19 thereof engaged within the circumferential groove 14 in the crank pin 12 after which the split resilient rings 20 and 21 are snapped or placed on the said ring sections 15 and 16 as herein above described. The retaining rings 25 and 26 are then slipped over the opposite ends of the crank shaft and the ball bearing 23 and 24 positioned between the said retaining rings 25 and 26 and the supporting rings 20 and 21 after which the said retaining rings are firmly clamped in position by means of the caps 29 and 35. Thus, it will be seen that the various parts are properly and firmly secured relative to one another. When it is desired to take up any play which may exist between the various parts, one or more of the shims 45 and 46 is or are removed and the nuts 44 tightened whereby to bring the caps 29 and 35 closer together and consequently press upon and force the retaining rings 25 and 26 inwardly.

In Figures 6 and 7 has been shown a somewhat modified form of the present invention and wherein the letter D generally indicates the ball bearing assembly for securing the connecting rod E to the crank shaft F. The crank shaft F includes the crank or throw arm 49 having the integral crank pin 50 formed with the central cylindrical portion 51 which tapers towards its opposite ends and is provided with a circumferentially extending rib 52. The ball bearing assembly D embodies in its construction a two-part ring including the semi-circular sections 53 and 54, each of said ring sections including a substantially wide base portion 55 adapted to rest upon the central cylindrical portion 51 of the crank pin 50, said base portions being formed on their inner surfaces and intermediate the side edges thereof with a circumferentially extending groove for receiving the circumferential rib 52. Each of the said ring sections further comprises the outwardly extending reduced intermediate portions 56 formed intermediate the side edges thereof with an outwardly projecting tongue 57 positioned in alinement with the circumferential rib 52. Adapted to encircle the semi-circular ring sections 53 and 54 at opposite sides of the tongues 57 are the bearing supporting rings 58 and 59, the outer corners thereof being formed with annular grooves for receiving the ball bearings 60 and 61.

This form of the invention also embodies the ball bearing retaining rings 62 and 63 which are secured in position by means of the top cap 64 carried by the connecting rod E and the bottom cap 65, said retaining rings and caps being of the same construction as referred to hereinabove in connection with the preferred form of the invention, said caps 64 and 65 being formed with the securing lugs 66 and 67 and 68 and 69 respectively through which are inserted the securing bolts 70 and 71, the lower ends of which receive the locking washers 72 and the nuts 73. Arranged on the said bolts 70 and 71 between the said securing lugs 66 and 68 and 67 and 69 respectively are a plurality of shims 74 and 75.

When securing the connecting rod E to the crank shaft F, the semi-circular ring sections 53 and 54 are first placed in position over the circumferential rib 52 after which the supporting rings 58 and 59 are placed in position on the ring sections as set forth hereinabove. The retaining rings 62 and 63 are then slipped over the opposite ends of the crank shaft and the ball bearings 60 and 61 then placed in position after which the said retaining rings are firmly clamped in position by means of the caps 64 and 65. Should it be desired to take up any play between the various parts, one or more of the shims 74 and 75 may be removed and the nuts 73 tightened whereby to force the retaining rings inwardly.

From the foregoing it will be seen that the essential difference between the preferred form of the invention and the form shown in Figures 6 and 7 lies in the manner of securing the semi-circular ring sections to the crank pin so as to prevent any lateral movement of the connecting rod relative to the crank shaft.

While the foregoing description has been confined to the use of the present invention in association with a connecting rod, it is of course to be understood, that with a few minor changes, the same may be readily adapted for use as a main bearing.

Changes in the details of construction may be resorted to without departing from or sacrificing the spirit of the invention so long as such changes fall within the scope of the appended claims.

What is claimed is:

1. An anti-friction bearing structure of the character described, comprising a pair of split annular bands, designed to position in end-to-end relation about a cylindrical body, a centrally positioned circumferentially extending tongue carried by each band section and forming with the assembled sections a complete annular outstanding tongue, a ball bearing supporting ring designed to engage over the assembled bands upon each side of said tongue, each ring having a circumferentially extending groove formed at the outer corner thereof, and a pair of ball bearing retaining rings, each designed to be positioned with the inner face thereof in opposition to the grooved portion of a supporting ring, to maintain a plurality of bearing balls in position against the adjacent supporting ring.

2. An anti-friction bearing structure of the character described, comprising a pair of split annular bands, designed to position in end-to-end relation about a cylindrical body, a centrally positioned circumferentially extending tongue carried by each band section and forming with the assembled sections a complete annular outstanding tongue, a ball bearing supporting ring designed to engage over the assembled bands upon each side of said tongue, each ring having a circumferentially extending groove formed at the outer corner thereof, and a pair of ball bearing retaining rings, each designed to be positioned with the inner face thereof in opposition to the grooved portion of a supporting ring, to maintain a plurality of bearing balls in position against the adjacent supporting ring, and a retaining rib member formed circumferentially of the inner face of each of said semi-circular band sections to set up an annular rib designed for engagement in a receiving groove formed in and about the body of a cylinder supporting the bearing.

3. A bearing structure of the character described, comprising a pair of semi-annular members designed to be positioned in end-to-end relation about a supporting cylindrical body, each of said members having formed in the inner face thereof, a circumferentially extending groove designed to receive a retaining flange or rib carried by the cylindrical body, each of said members further having at the central portion of the outer face thereof, a relatively wide circumferentially extending rib and a relatively narrow circumferentially extending rib formed centrally of the first mentioned rib, a pair of ball bearing supporting rings each having formed at the inner edge of one side thereof, a circumferentially extending angular recess, said rings each being designed to engage over the assembled annular member at one side of the central rib portions thereof and receiving in its angular recess the adjacent edge of the rib of greater width, each ring further having the outer corner of the opposite face provided with a circumferentially extending groove designed to receive bearing ball members, and a ball retaining ring designed to co-act with each of said supporting rings for maintaining bearing balls in position upon the supporting rings.

In testimony whereof I affix my signature.

FREDERICK C. BANTIN.